(12) United States Patent
Arakawa et al.

(10) Patent No.: US 8,400,715 B2
(45) Date of Patent: Mar. 19, 2013

(54) HIGH VARIABLE POWER ZOOM LENS

(75) Inventors: Akio Arakawa, Saitama (JP); Yuichi Muramatsu, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 13/045,015

(22) Filed: Mar. 10, 2011

(65) Prior Publication Data

US 2011/0164325 A1 Jul. 7, 2011

Related U.S. Application Data

(62) Division of application No. 12/458,314, filed on Jul. 8, 2009, now Pat. No. 8,238,038.

(30) Foreign Application Priority Data

Aug. 8, 2008 (JP) .................................. 2008-206018
Aug. 8, 2008 (JP) .................................. 2008-206019
Aug. 8, 2008 (JP) .................................. 2008-206020

(51) Int. Cl.
*G02B 15/14* (2006.01)
(52) U.S. Cl. ........................................ 359/687; 359/684
(58) Field of Classification Search .................. 359/687, 359/684
See application file for complete search history.

(56) References Cited

U.S. PATENT DOCUMENTS

| 7,457,049 | B2 | 11/2008 | Yoneyama |
| 7,492,524 | B2* | 2/2009 | Ito .................................. 359/683 |
| 7,746,563 | B2 | 6/2010 | Muramatsu et al. |
| 7,990,624 | B2* | 8/2011 | Fujisaki ......................... 359/687 |
| 2001/0022696 | A1* | 9/2001 | Nishio ........................... 359/687 |
| 2006/0072213 | A1 | 4/2006 | Shibayama et al. |

FOREIGN PATENT DOCUMENTS

| CN | 101174021 A | 9/2007 |
| CN | 101093277 A | 12/2007 |
| JP | 2003-295060 A | 10/2003 |
| JP | 2005-331697 A | 12/2005 |
| JP | 2006-106191 A | 4/2006 |
| JP | 2006-284763 A | 10/2006 |
| JP | 2006-295016 A | 10/2006 |
| JP | 2008-003195 A | 1/2008 |
| JP | 2010-019946 A | 1/2010 |

* cited by examiner

*Primary Examiner* — Jordan Schwartz
(74) *Attorney, Agent, or Firm* — Jacobson Holman PLLC

(57) ABSTRACT

A variable power zoom lens of four groups of lens pieces respectively exerting positive, negative, positive, and positive refractivities varies the power from the wide-angle end to the telephoto end as a result of the 1st and 2nd lens groups being separated more, the 2nd and 3rd lens groups, and the 3rd and 4th lens groups, coming closer to each other. The 3rd lens group has a leading set of lens pieces closer to the object side having a positive refractivity as a whole and the trailing set of lens pieces have negative refractivity as a whole, and the trailing set alone are moved to be orthogonal to the optical axis to compensate for defocus in the imaging plane. The 2nd lens group is displaced closer to objects for focusing.

5 Claims, 10 Drawing Sheets

HIGH VARIABLE POWER ZOOM LENS

CROSS-REFERENCE TO RELATED APPLICATIONS

The present patent application is a divisional application of U.S. patent application Ser. No. 12/458,314, filed Jul. 8, 2009 now U.S. Pat. No. 8,238,038, which is based on, and claims priority to, Japanese Patent Application No. JP 2008-206018, filed Aug. 8, 2008, Japanese Patent Application No. JP 2008-206019, filed Aug. 8, 2008, and Japanese Patent Application No. JP 2008-206020, filed Aug. 8, 2008, all of which are incorporated herein in their entireties by reference.

BACKGROUND OF THE INVENTION

1. Field of the Invention

The present invention relates to a high variable power zoom lens suitable for a single-lens reflex camera, and more particularly, it relates to a compact and lightweight, high variable power zoom lens that is capable of having a sufficient back focal length, suitable for a single-lens reflex camera, and advantageous in incorporating optical stabilizer or anti-vibration mechanism, and that is 75 degrees or even wider in field angle at the wide-angle end, approximately 3 to 4 in F-number at the wide-angle end and approximately 6 to 7 at the telephoto end, and about 15× in variable power ratio.

2. Description of Related Art Including Information Disclosed Under 37 CFR §§1.97 and 1.98

The recent drastic advancement in technologies of optical designs and manufacturing optics has enabled zoom lenses to be downsized more and enhanced in variable power. For instance, one type of the zoom lenses in the state of the arts have a variable power enhanced design and enable to incorporate an optical stabilizer or anti-vibration feature, which typically comprise four groups of lens pieces, namely, the 1st lens group of positive refractivity, the 2nd lens group of negative refractivity, the 3rd lens group of positive refractivity, and the 4th lens group of positive refractivity arranged in this order on the closer to objects first basis where the power is varied from the wide-angle end to the telephoto end as a result of the 1st and 2nd lens groups being separated more, and the 2nd and 3rd lens groups coming closer to each other, and the 3rd and 4th lens groups being varied in a distance therebetween. The 3rd lens group has a leading set of the lens pieces closer to the object side having a positive refractivity as a whole and a trailing set of the lens pieces having a negative refractivity as a whole, and the trailing set alone is moved in position approximately orthogonal to the optical axis so as to compensate for defocus in the imaging plane caused by a tremor of the user's hand(s), which can be corrected by the anti-vibration feature of which requirements are to satisfy the following formula:

$$3.5 < f1/fw < 8.0$$

where fw is a focal length of the zoom lens at the wide-angle end, and f1 is the focal length of the 1st lens group (see Patent Document 1 listed below).

Another type of the high variable power zoom lenses are compatible with an APS-C dimensioned image sensor and are dedicated to digital cameras, which also have four groups of lens pieces, namely, the 1st lens group of positive refractivity, the 2nd lens group of negative refractivity, the 3rd lens group of positive refractivity, and the 4th lens group of positive refractivity arranged in this order on the closer to objects first basis where the power is varied from the wide-angle end to the telephoto end as a result of the 1st and 2nd lens groups being separated to elongate an aerial distance therebetween, and the 2nd and 3rd lens groups coming closer to each other while simultaneously the 1st, 3rd, and 4th lens groups are moved all together closer to objects. The 2nd lens group are displaced for the focusing of which requirements are to satisfy the following formulae:

$$0.40 < fW/fbW < 0.55 \quad (1)$$

$$0.43 < \beta 34W/\beta 34T < 0.47 \quad (2)$$

$$40 < r5/d5W < 100 \quad (3)$$

$$1.1 < f3/f4 < 2.6 \quad (4)$$

where fW is a focal length of the zoom lens at the wide-angle end, fbW is a back focal length at the wide-angle end, $\beta 34W$ is a composite power of the 3rd and 4th lens groups at the wide-angle end, $\beta 34T$ is the composite power of the 3rd and 4th lens groups at the telephoto end, r5 is a radius of curvature of the surface designated by r5, d5W is a distance between the 1st and 2nd lens groups at the wide-angle end, f3 is the focal length of the 3rd lens group, and f4 is the focal length of the 4th lens group. This type of the zoom lenses are, regardless of their original design concept especially suitable for the APS-C size, able to ensure the same back focusing as those for image dimensions for 3.5 mm film (see Patent Document 2).

LIST OF PATENT DOCUMENTATIONS

Patent Document 1
Japanese Patent Unexamined Publication No. 2006-106191
Patent Document 2
Japanese Patent Unexamined Publication No. 2005-331697

As the consumer demands in the camera market have been trending from the conventional silver film cameras to digital single-lens reflex cameras, contaminants likely attached to optical imaging components such as charge-coupled devices (CCDs) and the like have become a matter of concern because of their adverse effects upon the resultant images. Due to the contaminants onto the CCDs, component lenses must be often replaced, and one of the goals of the newly developed high variable power zoom lenses is to avoid such frequent replacement. Among the significantly advanced group of the improved zoom lenses, none has attained the variable power higher than 15× while some of the remaining less aggressive groups cover as wide as about 75 degrees in field angle at the wide-angle end and are no more than 3 to 4 in F-number at the wide-angle end.

In general, as the variable power is raised, the lens groups are accordingly displaced more, associated with the increased variations in aberration, which results in compensation for the aberration being more difficult throughout the focal range. To overcome this, the lens groups must have their respective refractivities diminished to correct the aberration, or some of the lens pieces should be shaped to have an aspherical surface(s) for the same purpose. Reducing the refractivity in such manners, however, resultantly necessitates the lens groups to be displaced more for varying the power as much, and this leads to a more complicated cam barrel design as well as an increase in diameter of the zoom lens.

In the zoom lens as described in Patent Document 1, the component lens piece(s) has an aspherical surface(s), and there are three of the lens pieces in the leading set so as not to increase the number of the lens pieces for correcting the aberration. In the event of the power raised higher than 13×, the zoom lens is not able to sufficiently compensate for spherical aberration that would be caused in the 1st and/or 2nd lens groups at the telephoto end. In addition, another problem of an increase in the diameter of a filter arises.

The zoom lens disclosed in Patent Document 2 has the variable power of approximately 7×, and hence, even if the 3rd lens group has its refractivity diminished, it is avoidable that, as a result of varying the power of the zoom lens, the refractivity would never be reduced so much as −1× at which this lens group makes the comprehensive power invariable. Raising the variable power of the zoom lens up to 13× results adversely in the zoom lens being in focus at the varied focal length to cause the 3rd lens group to be diminished in power as low as −1× in some case. Additionally, the 3rd lens group becomes more aberration sensitive, and coping with this kind of troubles brings about disincentive and degrades their productivity.

The present invention is made to overcome the aforementioned problems with the prior art high power zoom lenses, and accordingly, it is an object of the present invention, especially of first two aspects of the invention described later, to provide a high power zoom lens of multi groups of lens pieces that is in focus at the varied focal length never to cause the 3rd lens group to be diminished in power as low as −1×.

It is another object of the present invention, especially of the first two aspects of the invention described later, to provide a high power zoom lens of multi groups of lens pieces where the 3rd lens group has a reduced sensitivity to aberration, which brings about incentive to enhance their productivity.

It is still another object of the present invention, especially of the first two aspects of the invention described later, to provide a high power zoom lens of which filter is effectively downsized in diameter.

It is yet another object of the present invention, especially of a third aspect of the invention described later, to provide a high power zoom lens that facilitates incorporation of an aperture stop controlling mechanism and an optical stabilizer or anti-vibration mechanism by elongating a distance from an aperture stop to an anti-vibration/compensation lens component and a distance from the latter to an image plane, and that is capable of enhancing the variable power up to as high as 18-270 mm in focal length.

It is further another object of the present invention, especially of the third aspect of the invention described later, to provide a high power zoom lens that has optics of a relatively small longitudinal dimension and has a filter of a reduced diameter.

BRIEF SUMMARY OF THE INVENTION

In a first aspect of the present invention, there is provided a high variable power zoom lens of four groups of lens pieces, namely, the 1st lens group of positive refractivity, the 2nd lens group of negative refractivity, the 3rd lens group of positive refractivity, and the 4th lens group of positive refractivity arranged in this order on the closer to objects first basis, where the power is varied from the wide-angle end to the telephoto end as a result of the 1st and 2nd lens groups being separated more, the 2nd and 3rd lens groups coming closer to each other, and the 3rd and 4th lens groups also coming closer to each other, and the 2nd lens group are displaced closer to objects for the focusing of which requirements are to satisfy the following formulae:

$$0.35 < f1/ft < 0.45 \quad (5)$$

$$0.04 < |f1|/ft < 0.065 \quad (6)$$

$$0.15 < f3/ft < 0.25 \quad (7)$$

where f1 is a focal length of the 1st lens group, f2 is the focal length of the 2nd lens group, f3 is the focal length of the 3rd lens group, and ft is the focal length of the entire optics of the zoom lens at the telephoto end, as a whole.

The first aspect of the invention will be detailed below:

The 3rd lens group has a leading set of lens pieces closer to the object side having a positive refractivity as a whole and a trailing set of lens pieces having a negative refractivity as a whole, and the trailing set alone is moved to be orthogonal to the optical axis so as to compensate for defocus in the imaging plane caused by a tremor of the user's hand(s).

The leading set of the 3rd lens group has three or more positive lens pieces at least one of which is a composite lens joined with a negative lens piece, and another stand-alone negative lens piece(s).

The leading set of the 3rd lens group has at least a single positive lens piece that is 80 or even higher in Abbe number.

The trailing set of the 3rd lens group includes a composite lens comprising an anterior negative lens piece and a posterior positive lens piece joined to the same in which the negative lens piece having its opposite major surfaces as concaved, the composite lens comprising an aspherical surface and the positive lens piece has its surface closer to objects as convexed.

The 1st lens group includes three of the lens pieces, namely, a composite lens of negative and positive lens pieces joined together, and another stand-alone positive lens piece, and at least one of both the positive lens pieces is 80 or even higher in Abbe number.

The 1st lens group includes three of the lens pieces, namely, a composite lens of negative and positive lens pieces joined together, and another stand-alone positive lens piece, and at least one of both the positive lens pieces is 1.55 or even higher in refractive index.

Formulae in the First Aspect of the Invention

The formula (5) defines a rate of the focal length of the zoom lens at the telephoto end to the focal length of the 1st lens group. When the rate exceeds the lower limit as defined in the formula (5), the focal length of the 1st lens group becomes shorter, and this is advantageous in downsizing the extension of the zoom lens, as a whole, while it is hard to compensate for spherical aberration and comatic aberration at the telephoto end. When the rate exceeds the upper limit as defined in the formula (5), the focal length of the 1st lens group becomes longer, and this means the lens groups are to be displaced more to ensure the focal length of the zoom lens at the telephoto end, which necessitates a more complicated cam design to unavoidably cause the zoom lens to be greater in radial dimensions. Since the zoom lens at the telephoto end has the 1st lens group disposed farther apart from the aperture stop, light beams incident upon the 1st lens group pass its periphery, and therefore, it is hard to compensate for the comatic aberration.

The formula (6) defines the rate of the focal length of the zoom lens at the telephoto end to the focal length of the 2nd lens group. When the rate exceeds the lower limit as defined in the formula (6), the focal length of the 2nd lens group becomes shorter, and this is advantageous in ensuring the same back focusing as that of 35-mm film cameras while it is hard to compensate for various types of aberration, especially, for field curvature. When the rate exceeds the upper limit as defined in the formula (6), the focal length of the 2nd lens group becomes longer, and this means the 2nd lens group are to be displaced more to vary the power, which is disadvantageous in downsizing the entire lens optics. For the purpose of moving the 2nd lens group forward or toward objects for the focusing, the 1st and 2nd lens groups must be separated more, allowing for the increased displacement of the 2nd lens group, which consequently brings about an increase in the diameter of the filter and the entire extension of the zoom lens.

The formula (7) defines the rate of the focal length of the zoom lens at the telephoto end to the focal length of the 3rd lens group. When the rate exceeds the lower limit as defined in the formula (7), the focal length of the 3rd lens group becomes shorter, which is advantageous in downsizing the entire lens optics. In this case, however, the performance is significantly degraded because it is hard to compensate for spherical aberration, and the 3rd lens group should become more sensitive to the manufacturing tolerances. When the rate exceeds to the upper limit as defined in the formula (7), the focal length of the 3rd lens group becomes longer, and this means the 3rd lens group are to be displaced more to vary the power, which is disadvantageous in downsizing the entire lens optics. Light flux directed from the 3rd lens group toward the 4th lens group is almost afocal, and the zoom lens at the wide-angle end has the 3rd lens group diminished in magnification for the imaging, which brings about an insufficient amount of light around the image plane of the zoom lens at the wide-angle end.

The refractivity of the 3rd lens group, although appropriately determined from the formula (7), yet performs unsatisfactorily to fully compensate for the spherical aberration caused in the 1st and 2nd lens groups in an attempt to implement the zoom lens of the variable power more than 15×. To cope with this, the improved version of the zoom lens takes an approach to do the compensation with a configuration using five of the lens pieces, namely, negative and positive lens pieces jointed together, a positive meniscus lens having its posterior surface greater in radius of curvature, another stand-alone positive lens piece, and a succeeding negative lens piece. If it is desired to further enhance the variable power, additional positive lens piece(s) may be used.

In addition, to compensate for chromatic aberration that is often conspicuous at the telephoto end, it is desirable that at least one of the positive lens pieces is 80 or even higher in Abbe number.

Moreover, when the variable power is as high as 15×, the chromatic aberration caused in the 1st lens group is significant at the telephoto end. Especially, to compensate for chromatic aberration of magnification, the positive lens piece(s) in the 1st lens group desirably has a relatively large Abbe number. Combining two of the positive lens pieces respectively made of glass having the Abbe number of 80 or above permits the chromatic aberration of magnification to be sufficiently corrected. In general, however, the glass of which Abbe number is 80 or above has a refractive index smaller than 1.5, and the resultant lens piece has a small radius of curvature. To overcome this, the lens piece must be thicker at its center, and this leads to the greater diameter of the filter and the increased diameter of the lens piece. In this improved version of the zoom lens, the lens piece of 80 or above in Abbe number is allocated to the second foremost position as a component lens in the 1st lens group while another lens piece of 55 or above in Abbe number and 1.55 or higher in refractive index is allocated to the third foremost position. In this way, raising the refractive index, as a whole, enables to prevent an increase in the diameter of the filter and the number of the component lens pieces.

In a second aspect of the present invention, there is provided a high variable power zoom lens of four groups of lens pieces, namely, the 1st lens group of positive refractivity, the 2nd lens group of negative refractivity, the 3rd lens group of positive refractivity, and the 4th lens group of positive refractivity arranged in this order on the closer to objects first basis, where the power is varied from the wide-angle end to the telephoto end as a result of the 1st and 2nd lens groups being separated more, the 2nd and 3rd lens groups coming closer to each other, and the 3rd and 4th lens groups also coming closer to each other, and the 2nd lens group are displaced along the optical axis for the focusing of which requirements are to satisfy the following formulae:

$$0.35 < f1/ft < 0.45 \tag{5}$$

$$0.5 < |f2|/fw < 0.8 \tag{8}$$

$$0.15 < f3/ft < 0.25 \tag{7}$$

where f1 is a focal length of the 1st lens group, fw is the focal length of the entire optics of the zoom lens at the wide angle end, f2 is the focal length of the 2nd lens group, f3 is the focal length of the 3rd lens group, and ft is the focal length of the entire optics of the zoom lens at the telephoto end.

The second aspect of the invention will be detailed below:

The 3rd lens group has a leading set of lens pieces closer to the object side having a positive refractivity as a whole and a trailing set of lens pieces having a negative refractivity as a whole, and the trailing set alone is moved to be orthogonal to the optical axis so as to compensate for defocus in the imaging plane caused by a tremor of the user's hand(s).

The leading set of the 3rd lens group has three or more positive lens pieces at least one of which is a composite lens joined with a negative lens piece, and another stand-alone negative lens piece(s).

The leading set of the 3rd lens group has at least a single positive lens piece that is 80 or even higher in Abbe number.

The trailing set of the 3rd lens group includes a composite lens comprising an anterior negative lens piece and a posterior positive lens piece joined to the same, the negative lens piece having its opposite major surfaces as concaved, the composite lens comprising an aspherical surface and the positive lens piece has its surface closer to objects as convexed.

The 1st lens group includes three of the lens pieces, namely, a composite lens of negative and positive lens pieces joined together, and another stand-alone positive lens piece, and at least one of both the positive lens pieces is 80 or even higher in Abbe number.

The 1st lens group includes three of the lens pieces, namely, a composite lens of negative and positive lens pieces joined together, and another stand-alone positive lens piece, and at least one of both the positive lens pieces is 1.55 or even higher in refractive index.

Formulae in the Second Aspect of the Invention

The formula (5) defines a rate of the focal length of the zoom lens at the telephoto end to the focal length of the 1st lens group. When the rate exceeds the lower limit as defined in the formula (5), the focal length of the 1st lens group becomes shorter, and this is advantageous in downsizing the extension of the zoom lens, as a whole, while it is hard to compensate for spherical aberration and comatic aberration at the telephoto end. When the rate exceeds the upper limit as defined in the formula (5), the focal length of the 1st lens group becomes longer, and this means the lens groups are to be displaced more to ensure the focal length of the zoom lens at the telephoto end, which necessitates a more complicated cam design to unavoidably cause the zoom lens to be greater in radial dimensions. Since the zoom lens at the telephoto end has the 1st lens group disposed farther apart from the aperture stop, light beams incident upon the 1st lens group pass its periphery, and therefore, it is hard to compensate for the comatic aberration.

The formula (8) defines the rate of the focal length of the zoom lens at the telephoto end to the focal length of the 2nd lens group. When the rate exceeds the lower limit as defined in the formula (8), the focal length of the 2nd lens group becomes shorter, and this is advantageous in ensuring the same back focusing as that of 35-mm film cameras while it is hard to compensate for various types of aberration, especially, for field curvature. When the rate exceeds the upper limit as defined in the formula (8), the focal length of the 2nd lens group becomes longer, and this means the 2nd lens group are to be displaced more to vary the power, which is disadvantageous in downsizing the entire lens optics. For the purpose of moving the 2nd lens group forward or toward objects for the focusing, the 1st and 2nd lens groups must be separated more, allowing for the increased displacement of the 2nd lens group, which consequently brings about an increase in the diameter of the filter and the entire extension of the zoom lens.

The formula (7) defines the rate of the focal length of the zoom lens at the telephoto end to the focal length of the 3rd lens group. When the rate exceeds the lower limit as defined in the formula (7), the focal length of the 3rd lens group becomes shorter, which is advantageous in downsizing the entire lens optics. In this case, however, the performance is significantly degraded because it is hard to compensate for spherical aberration, and the 3rd lens group should become more sensitive to the manufacturing tolerances. When the rate exceeds to the upper limit as defined in the formula (7), the focal length of the 3rd lens group becomes longer, and this means the 3rd lens group are to be displaced more to vary the power, which is disadvantageous in downsizing the entire lens optics. Light flux directed from the 3rd lens group toward the 4th lens group is almost afocal, and the zoom lens at the wide-angle end has the 3rd lens group diminished in magnification for the imaging, which brings about an insufficient amount of light around the image plane of the zoom lens at the wide-angle end.

The refractivity of the 3rd lens group, although appropriately determined from the formula (7), yet performs unsatisfactorily to fully compensate for the spherical aberration caused in the 1st and 2nd lens groups in an attempt to implement the zoom lens of the variable power more than 15×. To cope with this, the improved version of the zoom lens takes an approach to do the compensation with a configuration using five of the lens pieces, namely, negative and positive lens pieces jointed together, a positive meniscus lens having its posterior surface greater in radius of curvature, another stand-alone positive lens piece, and a succeeding negative lens piece. If it is desired to further enhance the variable power, additional positive lens piece(s) may be used.

In addition, to compensate for chromatic aberration that is often conspicuous at the telephoto end, it is desirable that at least one of the positive lens pieces is 80 or even higher in Abbe number.

Moreover, when the variable power is as high as 15×, the chromatic aberration caused in the 1st lens group is significant at the telephoto end. Especially, to compensate for chromatic aberration of magnification, the positive lens piece(s) in the 1st lens group desirably has a relatively large Abbe number. Combining two of the positive lens pieces respectively made of glass having the Abbe number of 80 or above permits the chromatic aberration of magnification to be sufficiently corrected. In general, however, the glass of which Abbe number is 80 or above has a refractive index smaller than 1.5, and the resultant lens piece has a small radius of curvature. To overcome this, the lens piece must be thicker at its center, and this leads to the greater diameter of the filter and the increased diameter of the lens piece. In this improved version of the zoom lens, the lens piece of 80 or above in Abbe number is allocated to the second foremost position as a component lens in the 1st lens group while another lens piece of 55 or above in Abbe number and 1.55 or higher in refractive index is allocated to the third foremost position. In this way, raising the refractive index, as a whole, enables to prevent an increase in the diameter of the filter and the number of the component lens pieces.

In a third aspect of the present invention, there is provided a high variable power zoom lens of multi groups of lens pieces, namely, the 1st lens group of positive refractivity, the 2nd lens group of negative refractivity, the 3rd lens group of positive refractivity, and the 4th lens group of positive refractivity arranged in this order on the closer to objects first basis, where the power is varied from the wide-angle end to the telephoto end as a result of the 1st and 2nd lens groups being separated more, the 2nd and 3rd lens groups coming closer to each other, and the 3rd and 4th lens groups also coming closer to each other, and the 3rd lens group has a leading set of lens pieces closer to the object side having a positive refractivity as a whole and a trailing set of lens pieces having a negative refractivity as a whole, and the trailing set alone is moved in position orthogonal to the optical axis to compensate for defocus in the imaging plane caused by a tremor of the user's hand(s) while the 2nd lens group are displaced closer to objects for the focusing of which requirements are to satisfy the following formula:

$$0.14 < |f3r/ft| < 0.18 \qquad (9)$$

where f3r is a focal length of the trailing set of the 3rd lens group, and ft is the focal length of the entire optics of the zoom lens at the telephoto end.

The third aspect of the invention will be detailed below:

The 3rd lens group has its trailing set alone moved in position orthogonal to the optical axis so as to compensate for defocus in the imaging plane caused by a tremor of the user's hand(s).

The leading set of the 3rd lens group has three or more positive lens pieces at least one of which is a composite lens joined with a negative lens piece, and another stand-alone negative lens piece(s).

The leading set of the 3rd lens group has at least a single positive lens piece that is 80 or even higher in Abbe number.

The trailing set of the 3rd lens group includes a composite lens comprising an anterior negative lens piece and a posterior positive lens piece joined to the same, the negative lens piece having its opposite major surfaces as concaved, the composite lens comprising an aspherical surface and the positive lens piece has its surface closer to objects as convexed.

The 1st lens group includes three of the lens pieces, namely, a composite lens of negative and positive lens pieces joined together, and another stand-alone positive lens piece, and at least one of both the positive lens pieces is 80 or even higher in Abbe number.

The 1st lens group includes three of the lens pieces, namely, a composite lens of negative and positive lens pieces joined together, and another stand-alone positive lens piece, and at least one of both the positive lens pieces is 1.55 or even higher in refractive index.

Formulae in the Third Aspect of the Invention

When the value |f3r/ft| exceeds the lower limit as defined in the formula (9), the power of the lens groups dedicated to stabilizing optics or anti-vibration is enhanced, and these lens groups are no longer to be displaced so much, which is effective in avoiding an increase in the diameter of the displaced lens groups although it produces an adverse effect of inability to compensate for comatic aberration at the telephoto end. In addition, the anti-vibration brings about greater variations in distortion aberration at the wide-angle end. The value f3r/ft exceeds the upper limit, the lens groups are to be displaced more for stabilizing the optics, and it is unavoidable that the displaced lens groups should have an increased diameter.

As mentioned above, the high variable power zoom lens in the first aspect of the present invention is capable of satisfactorily compensating for the spherical aberration caused in the 1st and 2nd lens groups at the telephoto end, and the zoom lens is in focus at the varied focal length never to cause the 3rd lens group to be diminished in power as low as −1×.

The high variable power zoom lens in the first aspect of the invention has the 3rd lens group reduced in sensitivity to the aberrations, which brings about an incentive to enhance their productivity.

The high variable power zoom lens in the first aspect of the present invention has a filter of which diameter is effectively downsized.

The high variable power zoom lens in the second aspect of the present invention is capable of satisfactorily compensating for the spherical aberration caused in the 1st and 2nd lens groups at the telephoto end, and the zoom lens is in focus at the varied focal length never to cause the 3rd lens group to be diminished in power as low as −1×.

The high variable power zoom lens in the second aspect of the invention has the 3rd lens group reduced in sensitivity to the aberrations, which brings about an incentive to enhance their productivity.

The high variable power zoom lens in the second aspect of the present invention has a filter of which diameter is effectively downsized.

The high variable power zoom lens in the third aspect of the invention facilitates incorporation of an aperture stop controlling mechanism and an optical stabilizer or anti-vibration mechanism by elongating a distance from an aperture stop to an anti-vibration/compensation lens component and a distance from the latter to an image plane, and the zoom lens is capable of enhancing the variable power up to as high as 18-270 mm in focal length.

The zoom lens in the third aspect of the invention has a reduced entire extension of the optics, as a whole, and also has a filter of the reduced diameter.

DETAILED DESCRIPTION OF THE INVENTION

Figure 1:
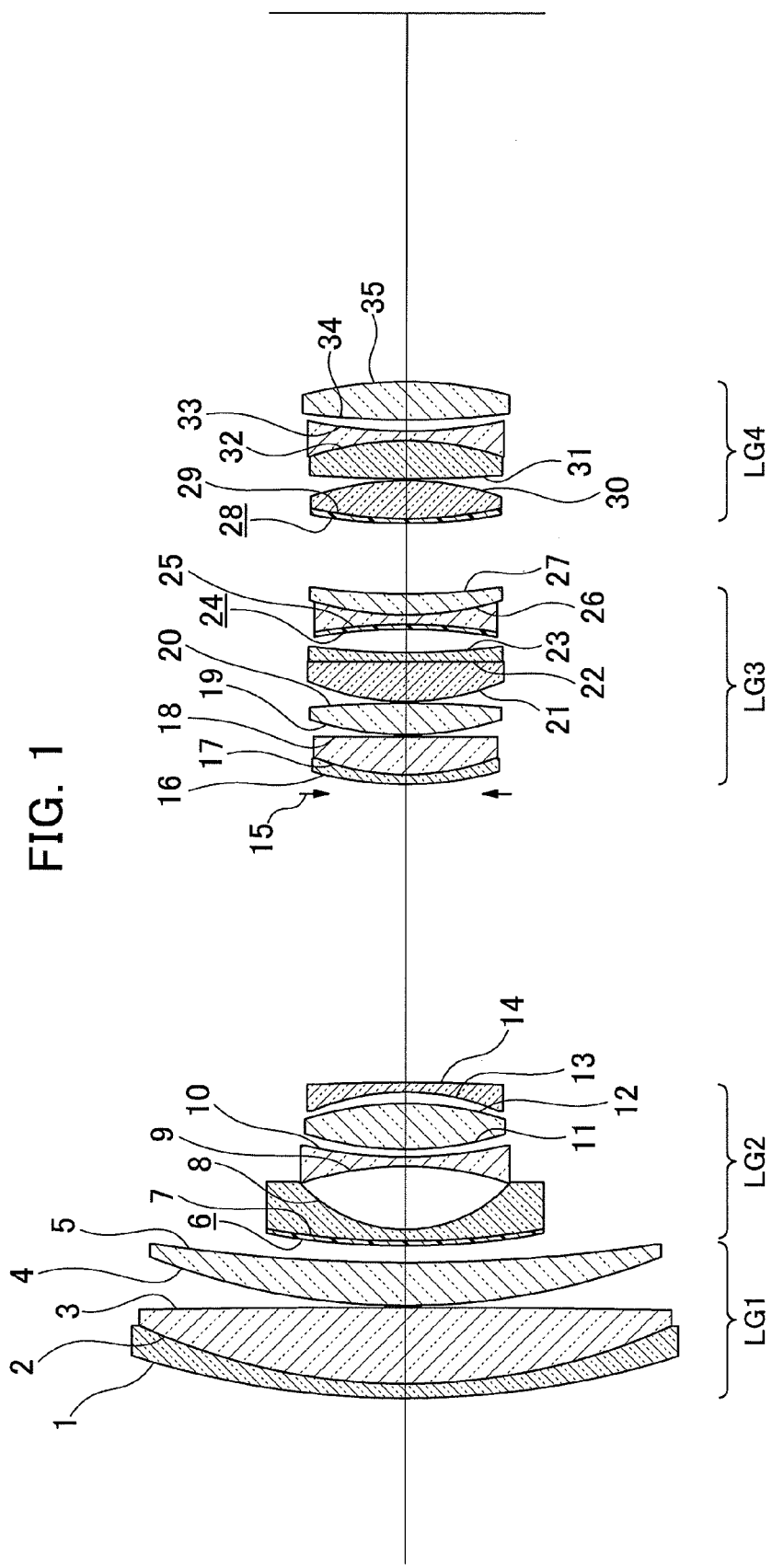
FIG. 1 is a sectional view illustrating optics of a preferred embodiment of a high variable power zoom lens at the telephoto end according to the present invention.
Figure 2:
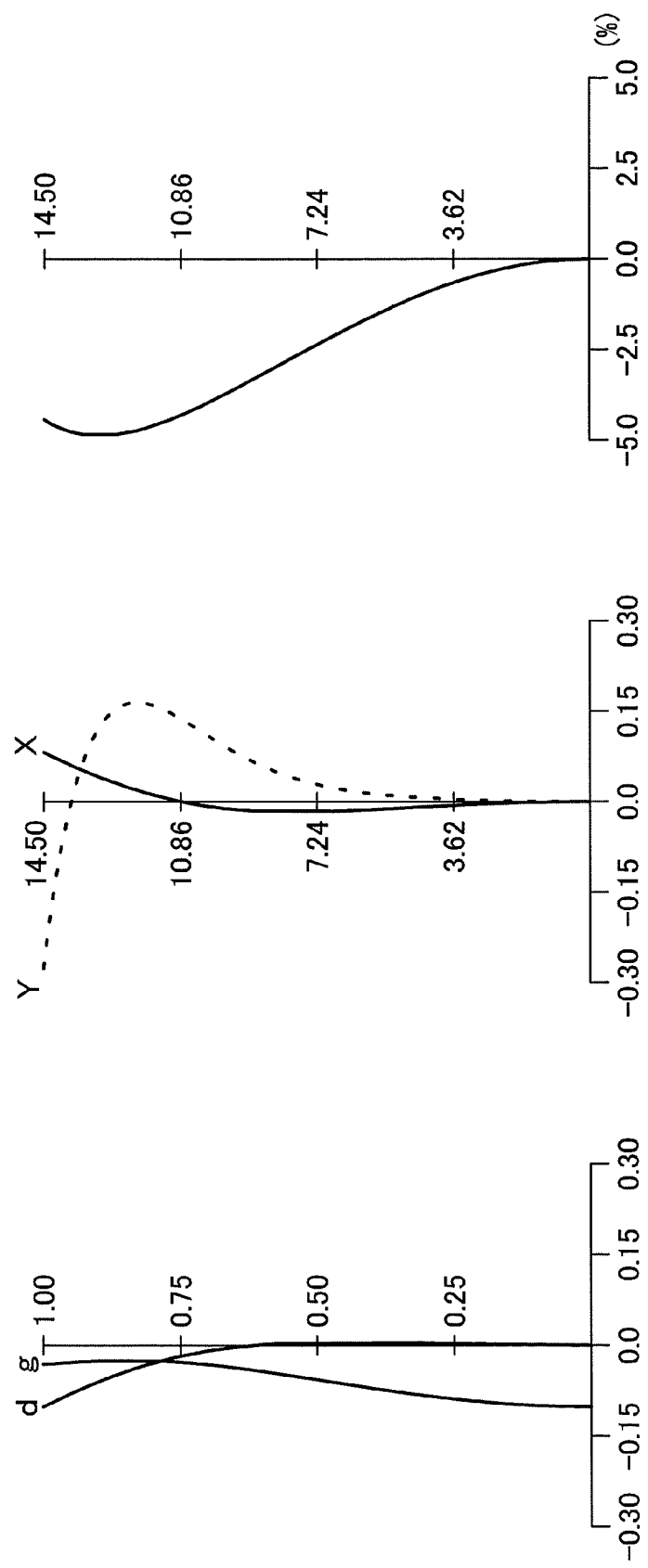
FIG. 2 illustrates graphs of axial spherical aberration, astigmatism, and aberration of distortion in the exemplary zoom lens at the wide-angle end.
Figure 3:
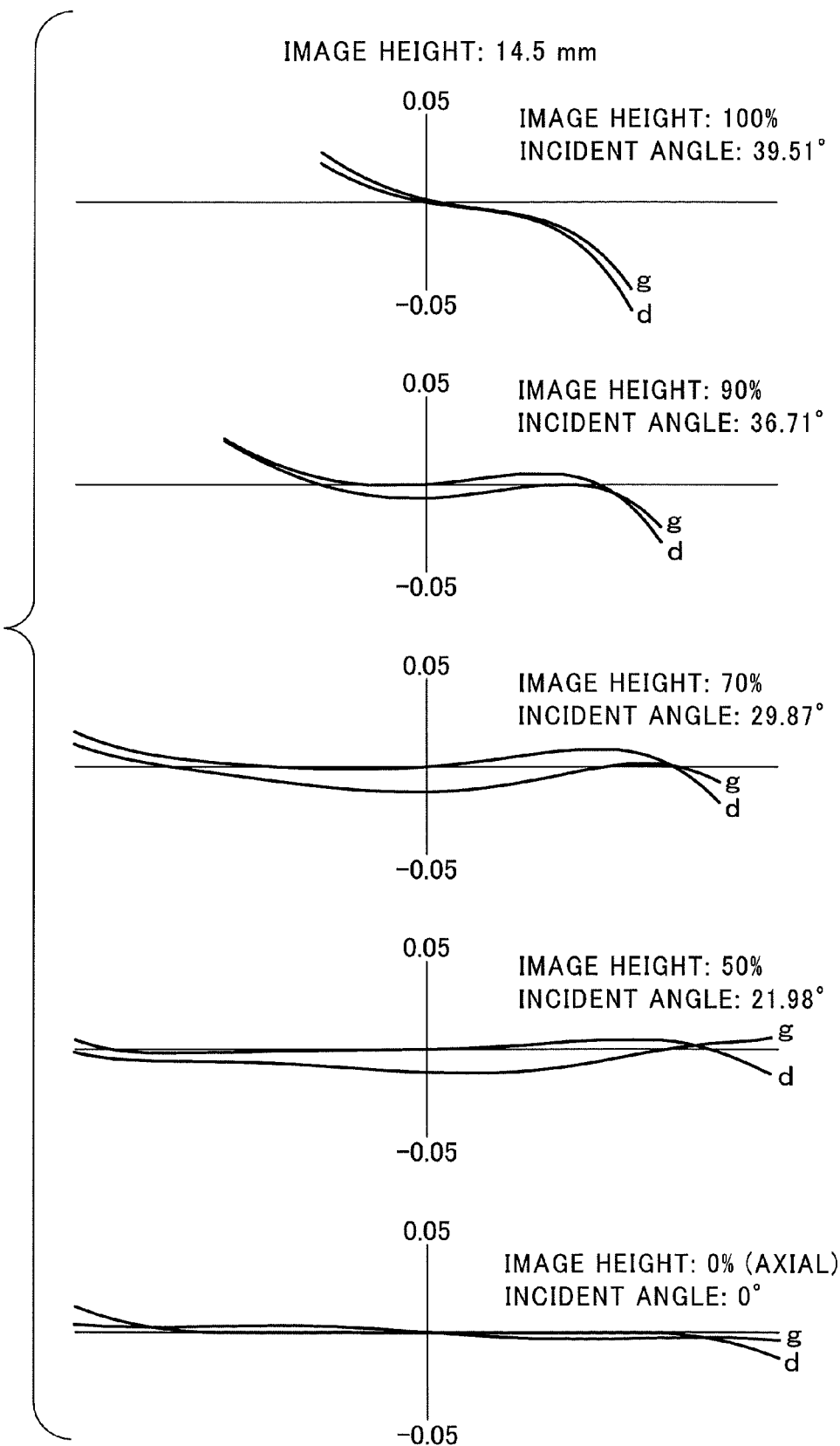
FIG. 3 illustrates graphs of comatic aberration in the exemplary zoom lens at the wide-angle end.
Figure 4:
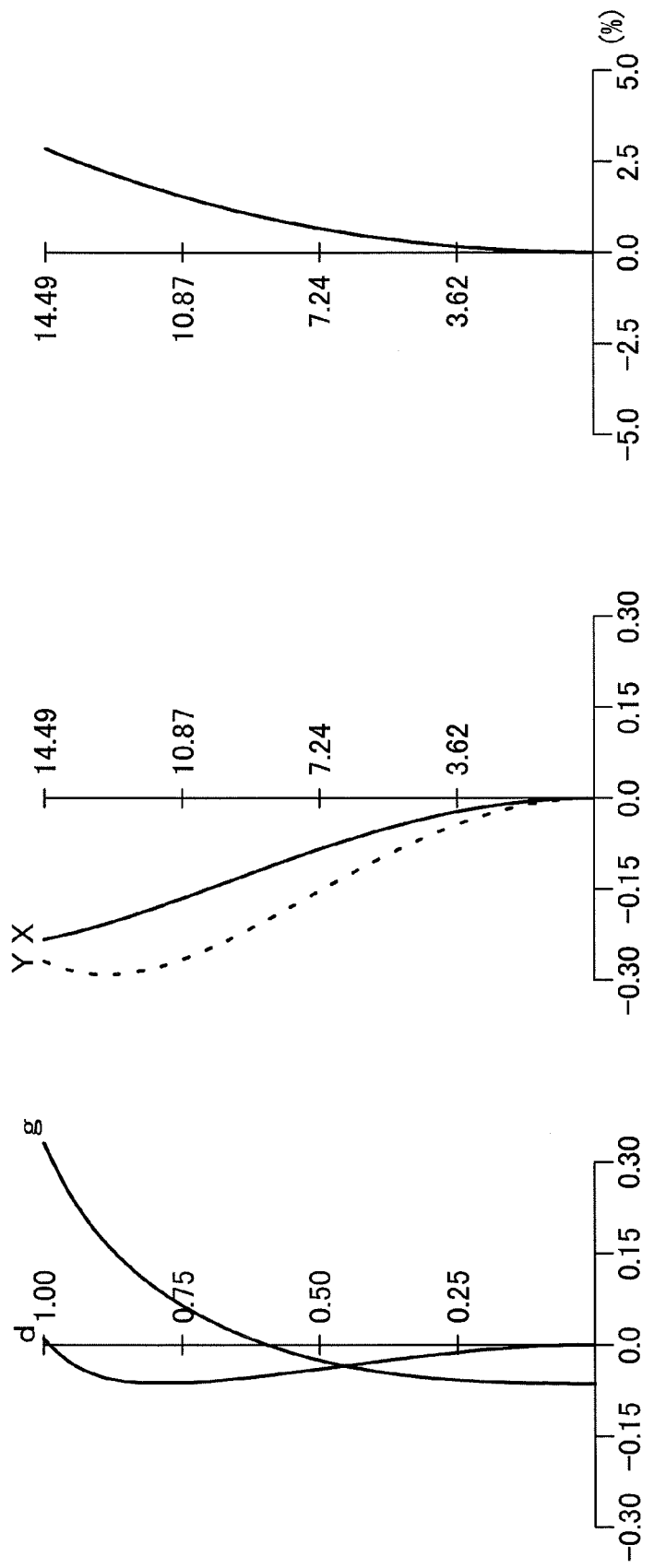
FIG. 4 illustrates graphs of the axial spherical aberration, the astigmatism, and the aberration of distortion in the exemplary zoom lens at its intermediate focal range.
Figure 5:
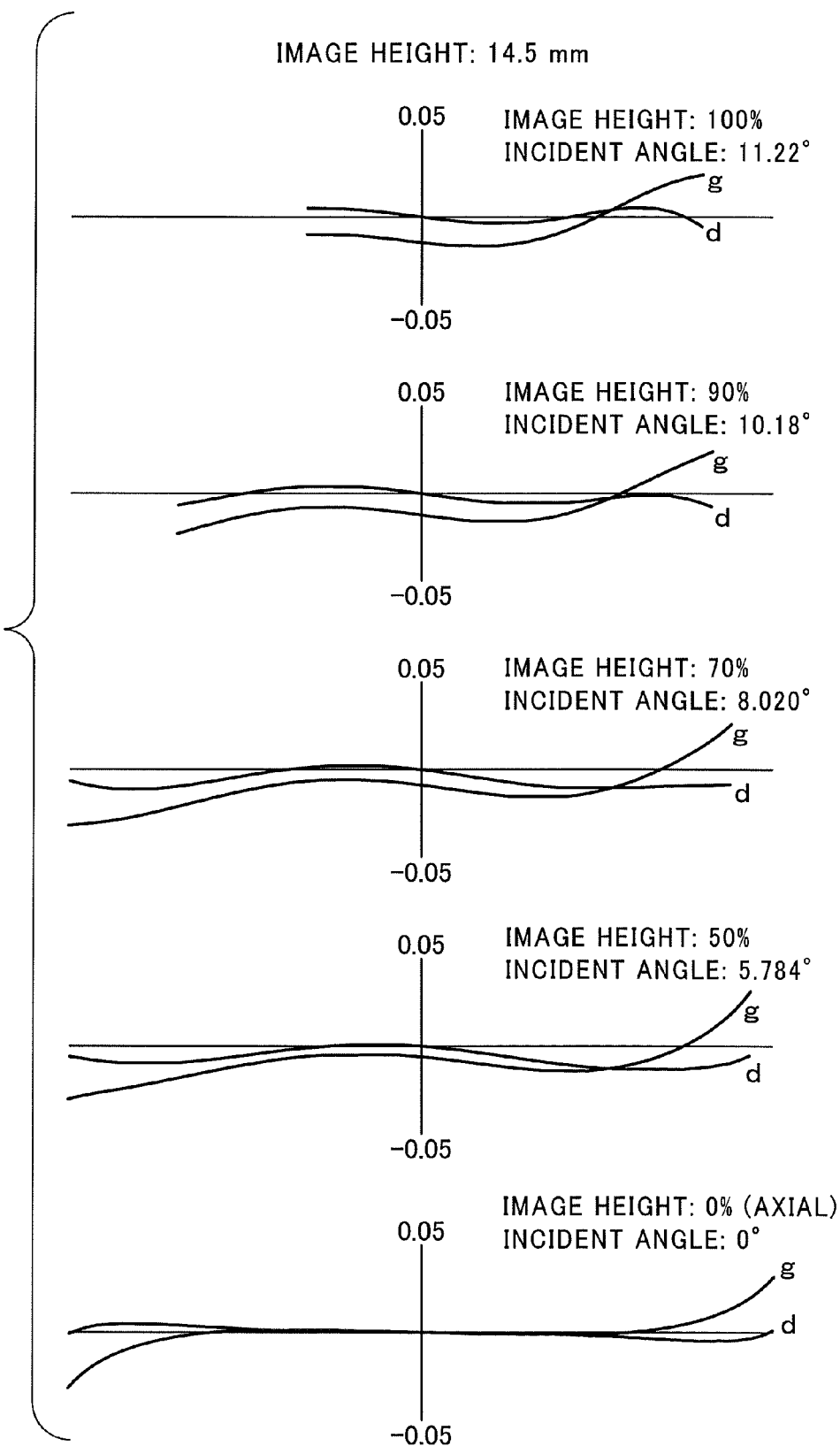
FIG. 5 illustrates graphs of the comatic aberration in the exemplary zoom lens at the intermediate focal range.
Figure 6:
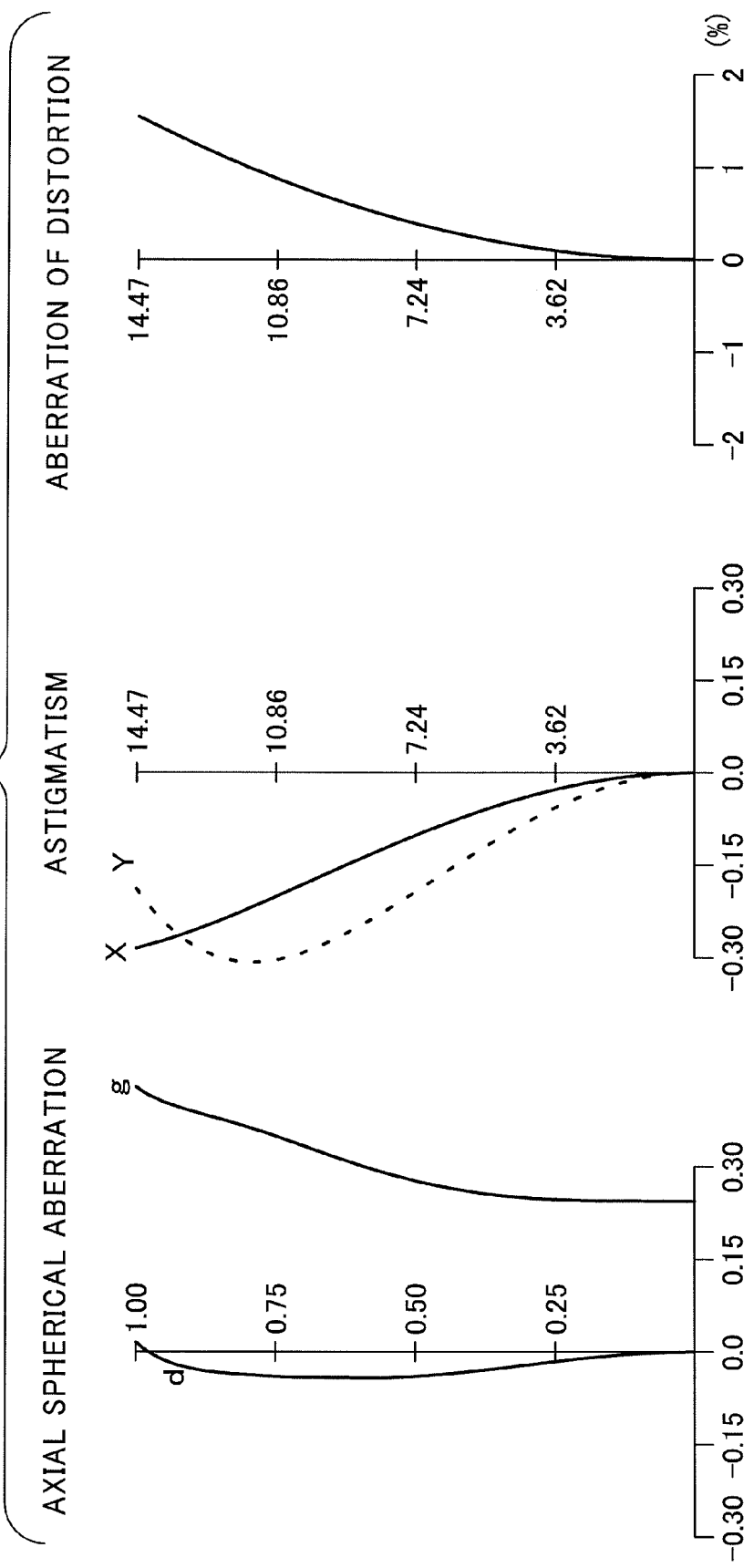
FIG. 6 illustrates graphs of the axial spherical aberration, the astigmatism, and the aberration of distortion in the exemplary zoom lens at the telephoto end.
Figure 7:
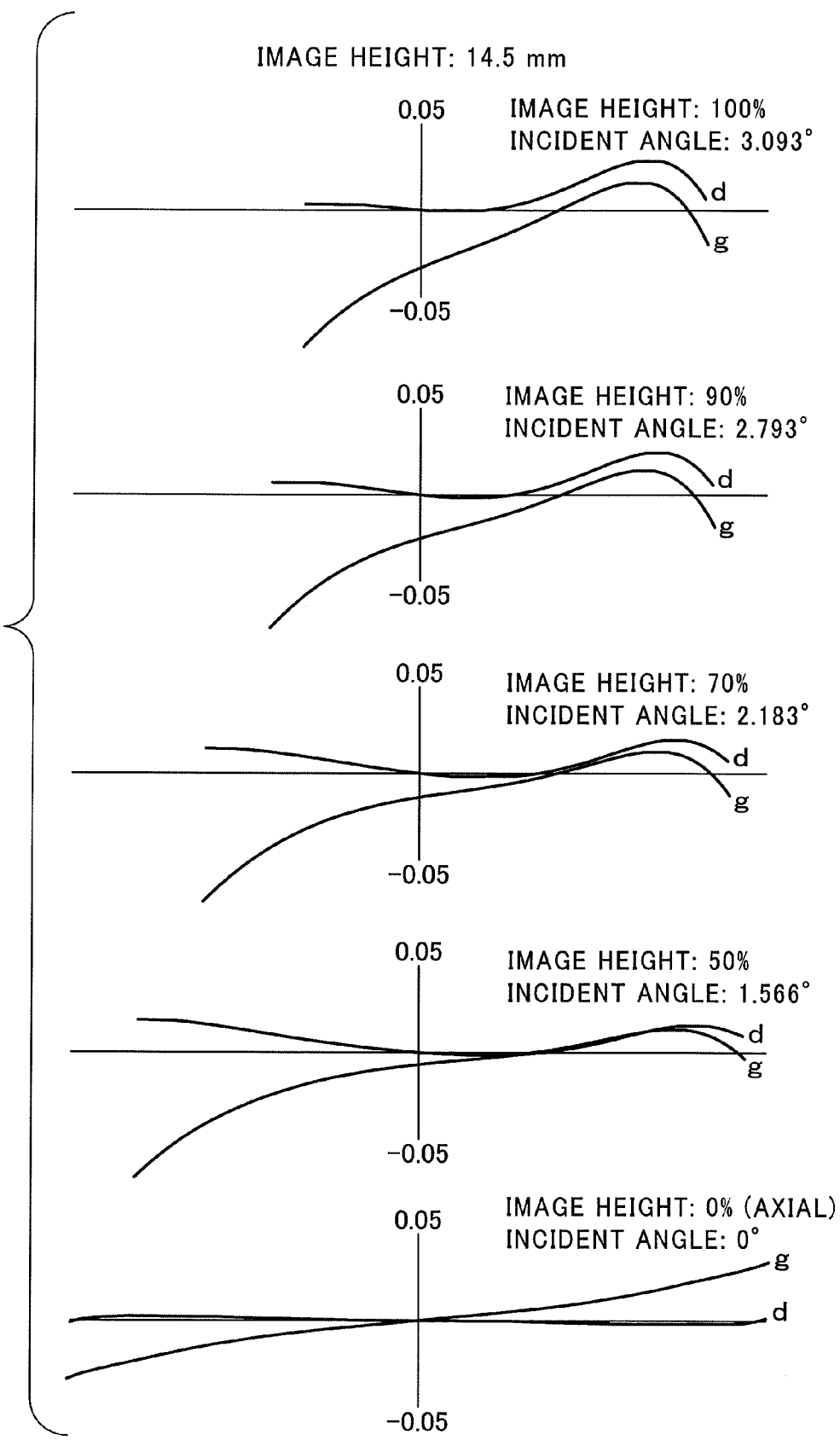
FIG. 7 illustrates graphs of the comatic aberration in the exemplary zoom lens at the telephoto end.
Figure 8:
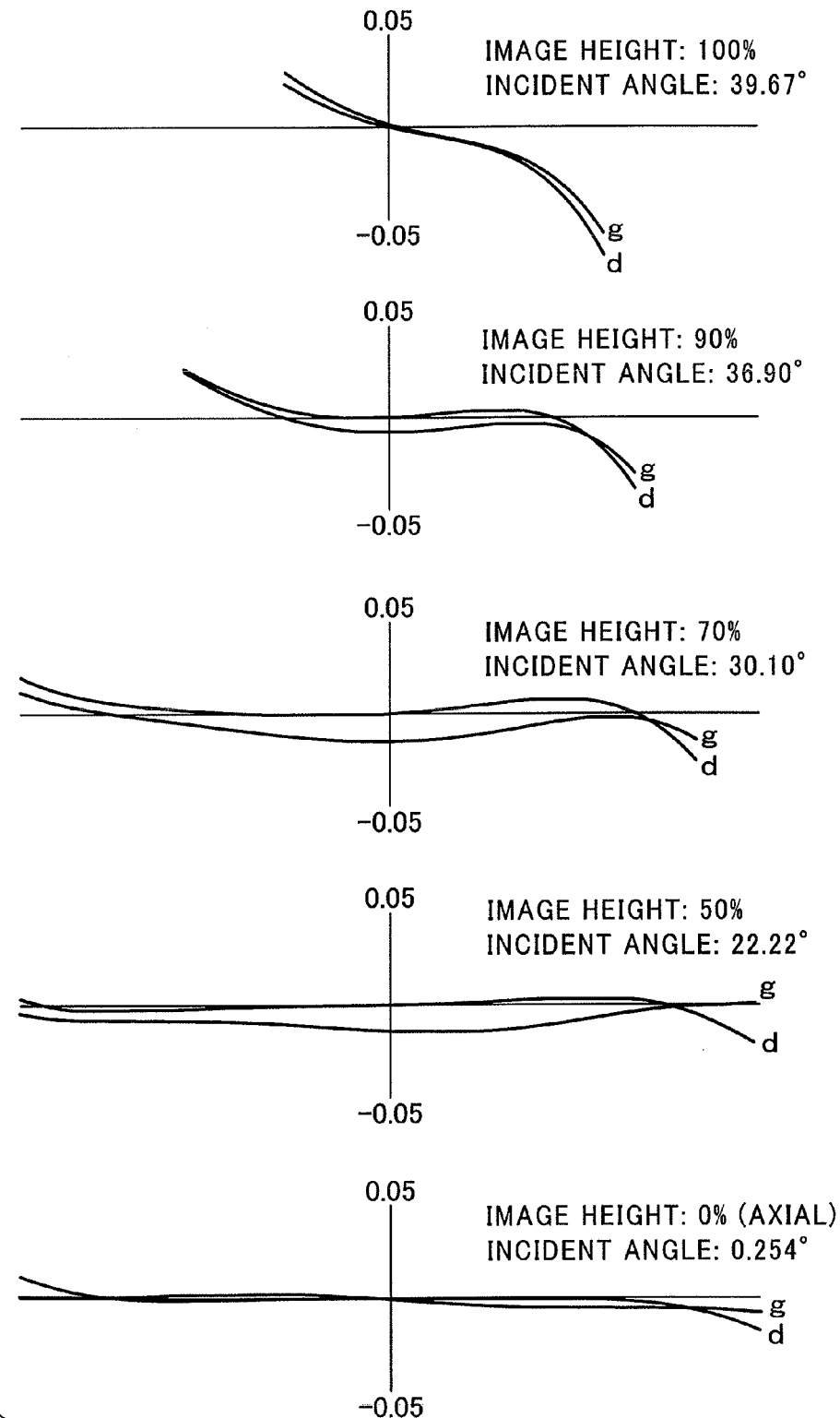
FIG. 8 illustrates graphs of the comatic aberration with a varied field angle when the 3rd lens group is displaced by +0.07 mm in vertical directions relative to the optical axis in the exemplary zoom lens at the wide-angle end.
Figure 9:
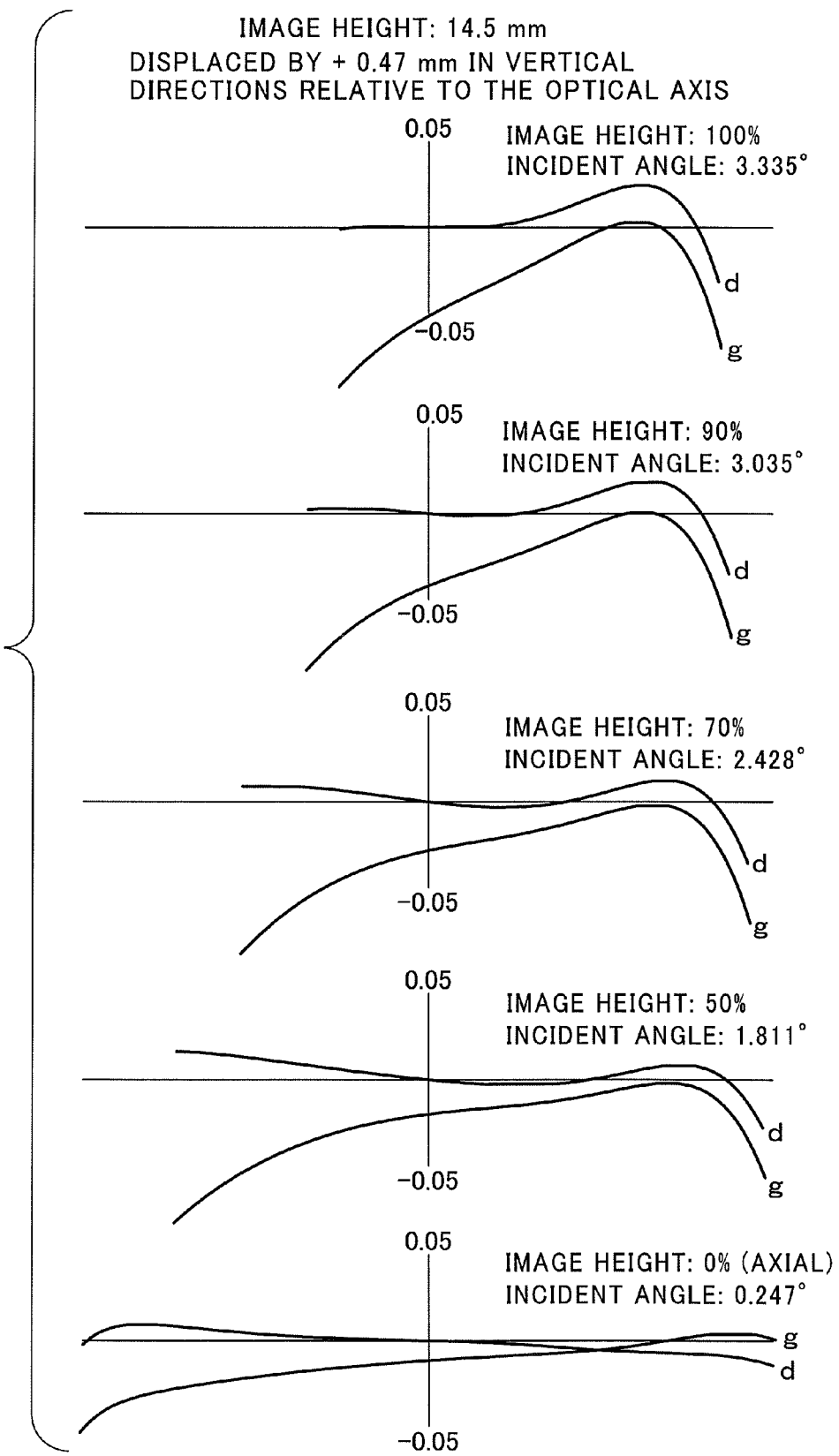
FIG. 9 illustrates graphs of the comatic aberration with the varied field angle when the 3rd lens group is displaced by +0.47 mm in vertical directions relative to the optical axis in the exemplary zoom lens at the telephoto end.
Figure 10:
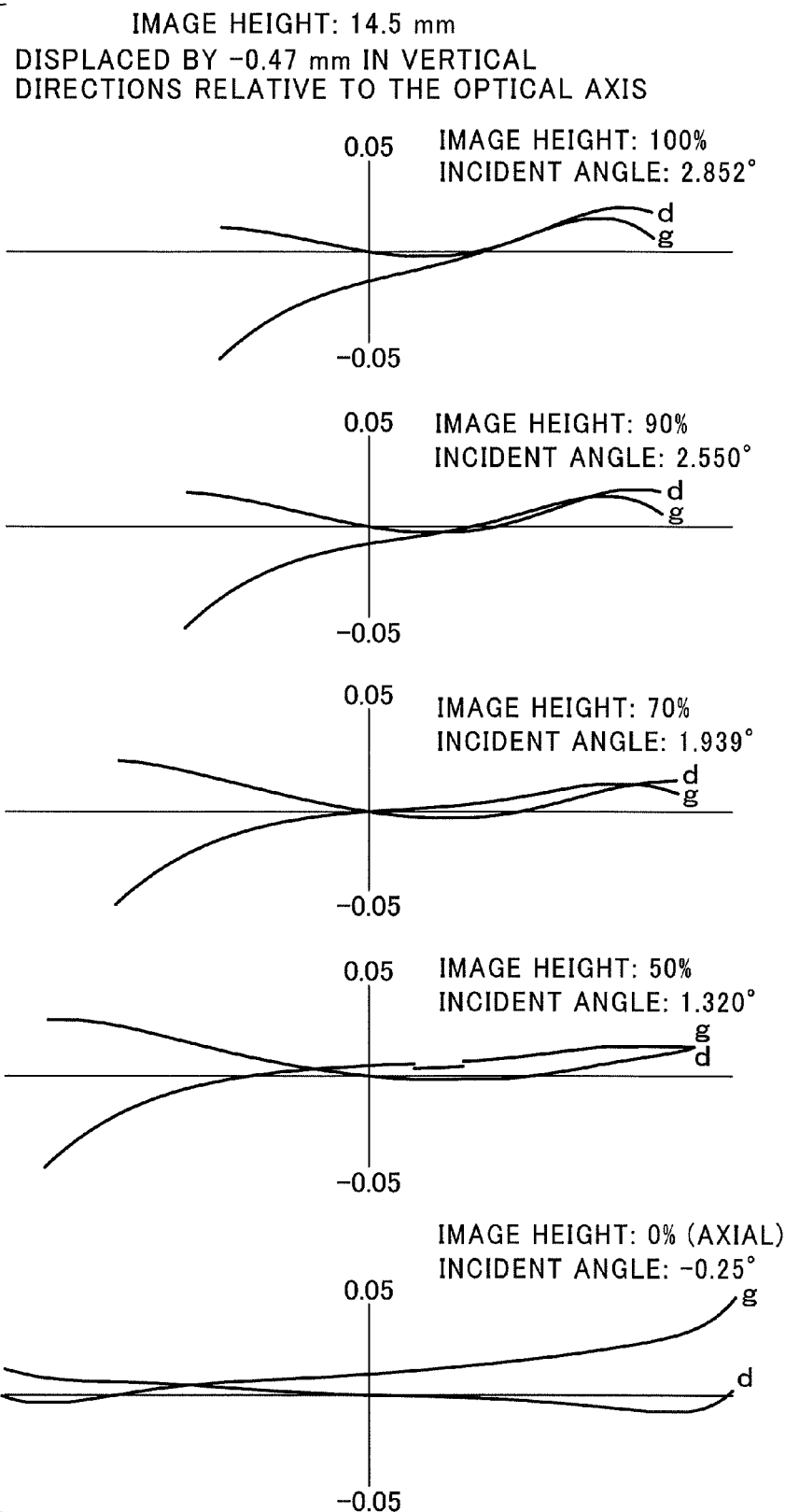
FIG. 10 illustrates graphs of the comatic aberration with the varied field angle when the 3rd lens group is displaced by −0.47 mm in vertical directions relative to the optical axis in the exemplary zoom lens at the telephoto end.

Preferred embodiments of a high variable power zoom lens according to the present invention will now be described.

Focal Length $f$=18.40~71.10~264.21 mm $Fno$=3.50~5.24~6.32

$2w$=76.5~23.1~6.3°

| NO | R | D | Nd | vd |
|---|---|---|---|---|
| 1 | 94.3524 | 1.5000 | 1.84666 | 23.78 |
| 2 | 66.4807 | 8.0000 | 1.49700 | 81.61 |
| 3 | −1326.8193 | 0.2000 | 1.00000 | |
| 4 | 72.3127 | 4.5000 | 1.61800 | 63.39 |
| 5 | 180.4067 | D5 | 1.00000 | |
| 6 | 90.3327 | 0.2000 | 1.51460 | 49.96 |
| 7 | 83.8997 | 1.2000 | 1.80400 | 46.58 |
| 8 | 14.845 | 6.4000 | 1.00000 | |
| 9 | −34.8049 | 1.0000 | 1.80400 | 46.58 |
| 10 | 47.2288 | 0.8000 | 1.00000 | |
| 11 | 34.7194 | 4.8000 | 1.84666 | 23.78 |
| 12 | −33.6597 | 1.2000 | 1.00000 | |
| 13 | −25.046 | 1.0000 | 1.88300 | 40.78 |
| 14 | −207.5416 | D14 | 1.00000 | |
| 15 | 0.0000 | 1.0000 | 1.00000 | |
| 16 | 37.3663 | 1.0000 | 1.84666 | 23.78 |
| 17 | 26.4946 | 4.0000 | 1.48749 | 70.21 |
| 18 | −1075.5953 | 0.2000 | 1.00000 | |
| 19 | 32.6392 | 3.2918 | 1.48749 | 70.21 |
| 20 | −111.6338 | 0.2000 | 1.00000 | |
| 21 | 25.7859 | 4.1440 | 1.49700 | 81.61 |
| 22 | 3099.5581 | 1.0000 | 1.83400 | 37.17 |
| 23 | 76.3793 | 2.7717 | 1.00000 | |
| 24 | −56.3646 | 0.2000 | 1.53610 | 41.20 |
| 25 | −56.3646 | 1.0000 | 1.77250 | 49.60 |
| 26 | 33.9463 | 2.2000 | 1.80810 | 22.80 |
| 27 | 68.76 | D27 | 1.00000 | |
| 28 | 46.2651 | 0.2000 | 1.51460 | 49.96 |
| 29 | 46.2651 | 4.0000 | 1.48749 | 70.21 |
| 30 | −30.1602 | 0.2000 | 1.00000 | |
| 31 | 146.4471 | 4.0000 | 1.48749 | 70.21 |
| 32 | −31.1609 | 1.0000 | 1.80400 | 46.58 |
| 33 | 50.4511 | 1.2000 | 1.00000 | |
| 34 | 92.7722 | 4.0000 | 1.48749 | 70.21 |
| 35 | −43.2518 | BF | | |

Distances D5, D14, D27, and variations in the back focal length BF during the zooming are given as follows:

| Focal Length f | 18.400 | 71.099 | 264.210 |
|---|---|---|---|
| D5 | 2.058 | 39.047 | 68.462 |
| D14 | 30.539 | 11.868 | 1.055 |

-continued

| | | | |
|---|---|---|---|
| D27 | 7.717 | 3.529 | 2.329 |
| Back Focal | 38.685 | 75.562 | 97.163 |

Surfaces of the lens pieces as identified with reference numerals 6, 24, 28 are aspherical in shape. A formula representing aspherical surfaces is given as follows:

$$x = \frac{H^2/r}{1+\sqrt{1-A(H/r)^2}} + A_4H^4 + A_6H^6 + A_8H^8 + A_{10}H^{10} \quad (10)$$

where x is the optical axis, H is a height orthogonal to the optical axis, r is a radius of curvature, A is a conical coefficient, and An is the number of the aspherical surfaces of the n-th degree as expressed by a varied exponent n.

Astigmatism coefficients regarding the surfaces of the lens pieces are given as follows:

R6
A=1.0
A4=7.56725E-06
A6=−7.65747E-09
A8=−2.26456E-11
A10=1.23747E-13
R24
A=1.0
A4=7.89296E-06
A6=9.60742E-09
A8=3.69345E-11
A10=−7.34306E-13
R28
A=1.0
A4=−3.19107E-05
A6=−5.55382E-09
A8=−3.27936E-11
A10=3.69412E-13

Focal lengths of the lens groups are given as follows:

| | |
|---|---|
| 1st Lens Group LG1 | Focal Length f1 = 108.563 |
| 2nd Lens Group LG2 | Focal Length f2 = −13.813 |
| 3rd Lens Group LG3 | Focal Length f3 = 45.230 |
| 4th Lens Group LG4 | Focal Length f4 = 48.815 |
| Leading Set of the 3rd Lens Group LG3 | Focal Length f3a = 26.822 |
| Trailing Set of the 3rd Lens Group LG3 | Focal Length f3b = −40.500 |

Values of the primary terms in the formulae set forth above in the context of the preferred embodiments according to the present invention are given as follows:

$$f1/ft=0.4030 \quad (11)$$

$$|f2|/ft=0.052 \quad (12)$$

$$f3/ft=0.1737 \quad (13)$$

Aberrations developed in each embodiment of the high variable power zoom lens according to the present invention are depicted in the accompanying drawings. In graphs illustrating axial spherical aberration and comatic aberration, 'd' denotes the d-line (587.56 nm), and 'g' designates the g-line (435.83 nm). In the graphs illustrating astigmatism, a height of the image is represented as Y=f14.5, the solid line shows aberration of sagittal image distortion while the broken line shows aberration of meridian image distortion. In the graphs illustrating aberration of distortion, the height of the image is given by Y=14.5.

What is claimed is:

1. In a variable power zoom lens of multi groups of lens pieces, namely, the 1st lens group of positive refractivity, the 2nd lens group of negative refractivity, the 3rd lens group of positive refractivity, and the 4th lens group of positive refractivity arranged in this order on the closer to objects first basis, the power is varied from the wide-angle end to the telephoto end as a result of the 1st and 2nd lens groups being separated more, the 2nd and 3rd lens groups coming closer to each other, and the 3rd and 4th lens groups also coming closer to each other, and the 3rd lens group has a leading set of lens pieces closer to the object side having a positive refractivity as a whole and a trailing set of lens pieces having a negative refractivity as a whole, and the trailing set alone are moved in position orthogonal to the optical axis to compensate for defocus in the imaging plane caused by a tremor of the user's hand(s) while the 2nd lens group is displaced closer to objects for the focusing of which requirements are to satisfy the following formula:

$$0.14<|f3r/ft|<0.18 \quad (9)$$

where f3r is a focal length of the trailing set of the 3rd lens group, and ft is the focal length of the entire optics of the zoom lens at the telephoto end, and wherein the leading set of the 3rd lens group has three or more positive lens pieces at least one of which is a composite lens joined with a negative lens piece, and another negative lens piece(s).

2. The variable power zoom lens according to claim 1, wherein the leading set of the 3rd lens group has at least a positive lens piece that is 80 or even higher in Abbe number.

3. The variable power zoom lens according to claim 1, wherein the trailing set of the 3rd lens group includes a composite lens comprising an anterior negative lens piece and a posterior positive lens piece joined to the same, the negative lens piece having its opposite major surfaces as concaved, the composite lens comprising an aspherical surface and the positive lens piece has its surface closer to objects as convexed.

4. The variable power zoom lens according to claim 1, wherein the 1st lens group includes three of the lens pieces, namely, a composite lens of negative and positive lens pieces joined together, and another stand-alone positive lens piece, and at least one of both the positive lens pieces is 80 or even higher in Abbe number.

5. The variable power zoom lens according to claim 1, wherein the 1st lens group includes three of the lens pieces, namely, a composite lens of negative and positive lens pieces joined together, and another stand-alone positive lens piece, and at least one of both the positive lens pieces is 1.55 or even higher in refractive index.

* * * * *